US012603309B2

(12) United States Patent
Ha et al.

(10) Patent No.: US 12,603,309 B2
(45) Date of Patent: Apr. 14, 2026

(54) AIR SUPPLY SYSTEM FOR FUEL CELLS AND METHOD FOR CONTROLLING THE SAME

(71) Applicants: Hyundai Motor Company, Seoul (KR); Kia Corporation, Seoul (KR)

(72) Inventors: Jae Ok Ha, Whasung-Si (KR); Dae Jong Kim, Whasung-Si (KR); Jae Won Jung, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 535 days.

(21) Appl. No.: 18/117,110

(22) Filed: Mar. 3, 2023

(65) Prior Publication Data

US 2024/0014423 A1     Jan. 11, 2024

(30) Foreign Application Priority Data

Jul. 6, 2022     (KR) ........................ 10-2022-0083288

(51) Int. Cl.
| | |
|---|---|
| *H01M 8/04664* | (2016.01) |
| *G05D 16/20* | (2006.01) |
| *H01M 8/04089* | (2016.01) |
| *H01M 8/043* | (2016.01) |
| *H01M 8/0438* | (2016.01) |

(Continued)

(52) U.S. Cl.
CPC .... *H01M 8/04664* (2013.01); *G05D 16/2013* (2013.01); *H01M 8/04089* (2013.01); *H01M 8/043* (2016.02); *H01M 8/04395* (2013.01); *H01M 8/04753* (2013.01); *H01M 8/04873* (2013.01)

(58) Field of Classification Search
CPC .......... G05D 16/2013; H01M 2250/20; H01M 8/04089; H01M 8/043; H01M 8/04388; H01M 8/04395; H01M 8/04559; H01M 8/04664; H01M 8/04753; H01M 8/04873; Y02E 60/50
See application file for complete search history.

(56) References Cited

U.S. PATENT DOCUMENTS

| | | | |
|---|---|---|---|
| 2008/0299426 A1 | 12/2008 | Ando et al. | |
| 2016/0141654 A1* | 5/2016 | Saito ................. | H01M 8/04089 |
| | | | 429/446 |

FOREIGN PATENT DOCUMENTS

| | | | | |
|---|---|---|---|---|
| CN | 110148768 A | * | 8/2019 | ........ H01M 8/04574 |
| JP | 2003-187834 | | 7/2003 | |
| JP | 2012-089523 | | 5/2012 | |

(Continued)

OTHER PUBLICATIONS

Machine translation CN110148768A (Year: 2019).*

*Primary Examiner* — Victoria H Lynch
(74) *Attorney, Agent, or Firm* — MORGAN, LEWIS & BOCKIUS LLP

(57) ABSTRACT

An air supply system for fuel cells includes a fuel cell, an air supply line connected to a cathode of the fuel cells to supply external air to the cathode of the fuel cell, an air pressure sensor provided on the air supply line, and configured to measure a pressure in the air supply line, a determiner configured to determine whether correction for the air pressure is necessary, and a controller connected to the determiner and configured to perform the correction for the air pressure sensor by performing voltage control of the fuel cell, upon determining that the correction for the air pressure sensor is necessary.

19 Claims, 2 Drawing Sheets

(51) Int. Cl.
    *H01M 8/04746*      (2016.01)
    *H01M 8/04858*      (2016.01)

(56)            References Cited

FOREIGN PATENT DOCUMENTS

| JP | 2012-134166 | 7/2012 |
| KR | 10-2016-0058019 | 5/2016 |
| KR | 10-2017-0068712 | 6/2017 |
| KR | 10-2019-0134062 | 12/2019 |
| WO | WO2014-103589 | 7/2014 |

* cited by examiner

AIR SUPPLY SYSTEM FOR FUEL CELLS AND METHOD FOR CONTROLLING THE SAME

CROSS-REFERENCE TO RELATED APPLICATION

The present application claims priority to Korean Patent Application No. 10-2022-0083288, filed on Jul. 6, 2022, the entire contents of which is incorporated herein for all purposes by this reference.

BACKGROUND OF THE PRESENT DISCLOSURE

Field of the Present Disclosure

The present disclosure relates to an air supply system for fuel cells which has an air pressure sensor configured to control the pressure of a cathode of the fuel cell, and performs correction for the air pressure sensor by performing voltage lowering control of the fuel cell in the idle state of the fuel cell when power generation by the fuel cell is stopped, and a method for controlling the air supply system.

Description of Related Art

In general, a fuel cell system includes a fuel cell which generates electrical energy through chemical reactions, an air supply system which supplies air to a cathode of the fuel cell, and a hydrogen supply system which supplies hydrogen to an anode of the fuel cell.

The air supply system for fuel cells includes an air supply line connected to the cathode of the fuel cell, an air compressor provided on the air supply line and configured to supply air to the fuel cell, and control valves configured to control the air supplied to the fuel cell. Furthermore, the control valves include an air cutoff valve and an air pressure control valve. The air pressure control valve serves to control the pressure of air supplied to the fuel cell in the state in which the fuel cell generates power. The pressure of air supplied to the fuel cell is controlled by fixing the opening amount of the air pressure control valve depending on a target air flow rate or the operation temperature of the fuel cell during normal operation of the fuel cell.

However, because the opening amount of the air pressure control valve fixed depending on specific conditions is used, an error in pressure control occurs when the external temperature or the operating environment of the fuel cell is changed from the specific conditions. To minimize the error, it is necessary to adjust the opening amount of the air pressure control value by performing air pressure feedback control of the cathode of the fuel cell. Therefore, an air pressure sensor which measures the pressure of the cathode of the fuel cell needs to be provided. The air pressure sensor detects the pressure of the cathode of the fuel cell, and feedback control is performed based on the detected pressure, adjusting the opening amount of the air pressure control valve.

However, the air pressure sensor causes an error in a detecting value depending on the mounted position of the air pressure sensor, and an excessive amount or an insufficient air amount is supplied to the fuel cell due to the error in the detecting value. Accordingly, pressure reversal may occur in the fuel cell, the fuel cell may deteriorate, or the demand output of the fuel cell may not be satisfied.

Furthermore, to reduce a detecting error of the air pressure sensor, correction of the error in the detecting value of the air pressure sensor is performed after operation of the fuel cell has been terminated. However, the air pressure sensor detects the pressure of air supplied to the fuel cell during operation of the fuel cell, and correction for the air pressure sensor using a derived correction value after operation of the fuel cell has been terminated causes low consistency.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an air supply system for fuel cells which performs correction for the air pressure sensor by performing voltage lowering control of the fuel cell in the idle state of the fuel cell when power generation by the fuel cell is stopped, and a method for controlling the air supply system.

In accordance with an aspect of the present disclosure, the above and other objects may be accomplished by the provision of an air supply system for fuel cells, including a fuel cell, an air supply line connected to a cathode of the fuel cells to supply external air to the cathode of the fuel cell, an air pressure sensor provided on the air supply line, and configured to measure a pressure in the air supply line, a determiner configured to determine whether or not the correction for the air pressure sensor is necessary, and a controller connected to the determiner and configured to perform the correction for the air pressure sensor by performing voltage control of the fuel cell, when the determiner concludes that the correction for the air pressure sensor is necessary.

The determiner may determine whether or not the correction for the air pressure sensor is necessary in an idle state of the fuel cell after stoppage of power generation by the fuel cell.

The air supply system for fuel cells may further include an air compressor provided on the air supply line, and configured to supply air to the fuel cell, and an air cutoff valve provided on the air supply line, and located between the fuel cell and the air compressor, and the air pressure sensor may be provided between the fuel cell and the air cutoff valve on the air supply line.

The determiner may determine that the correction for the air pressure sensor is necessary, when the air pressure sensor detects the pressure for a time exceeding a reference time.

The determiner may determine that the correction for the air pressure sensor is necessary, when a time measurement function to measure a detecting time of the air pressure sensor is out of order.

The controller may perform voltage lowering control of the fuel cell in an idle state, upon determining that the correction for the air pressure sensor is necessary, and may perform correction for the air pressure sensor, when lowering of a voltage of the fuel cell has been completed.

The controller may perform the voltage lowering control of the fuel cell until an air cutoff valve is opened and operation of the air compressor is stopped.

The air supply system for fuel cells may further include an air pressure control valve provided on the air supply line and connected to the controller, and located at an outlet side of the cathode of the fuel cell, and the controller may perform the voltage lowering control of the fuel cell by shutting off the air pressure control valve.

The controller may be configured to determine that lowering of the voltage of the fuel cell has been completed, when operation of the air compressor is stopped, and may perform correction for the air pressure sensor.

The controller may perform voltage maintenance control of the fuel cell so that the fuel cell maintains an idle state, after the correction for the air pressure sensor has been performed.

The controller may perform the voltage maintenance control by fixing revolutions per minute (RPM) of the air compressor to a reference RPM and controlling an air cutoff valve provided on the air supply line.

In accordance with another aspect of the present disclosure, there is provided a method for controlling an air supply system for fuel cells, including determining, by a determiner, whether or not correction for an air pressure sensor is necessary, and performing, by a controller, the correction for the air pressure sensor by performing voltage control of a fuel cell, upon determining that the correction for the air pressure sensor is necessary.

In the determining as to whether or not the correction for the air pressure sensor is necessary, the determiner may determine that the correction for the air pressure sensor is necessary when the air pressure sensor is operated for a time exceeding a reference time.

In the determining as to whether or not the correction for the air pressure sensor is necessary, the determiner may determine that the correction for the air pressure sensor is necessary when a time measurement function is out of order.

In the performing correction for the air pressure sensor, the controller may perform voltage lowering control of the fuel cell to open an air cutoff valve, to stop operation of an air compressor and to shut off an air pressure control valve.

In the performing correction for the air pressure sensor, the controller may perform correction for the air pressure sensor, when the air compressor is completely stopped through the voltage lowering control of the fuel cell.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

The above and other objects, features and other advantages of the present disclosure

Figure 1:
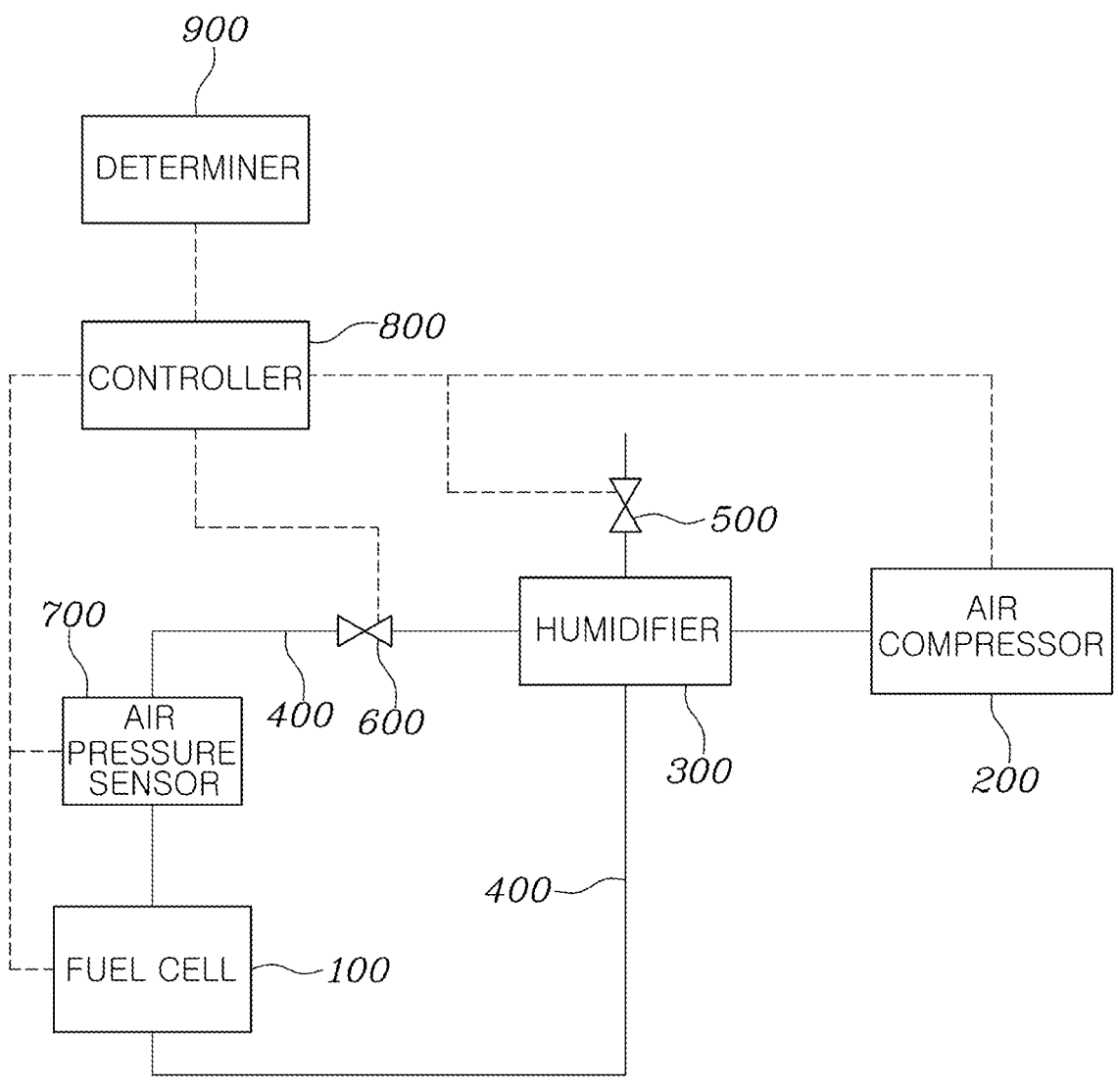
FIG. 1 is a block diagram of an air supply system for fuel cells according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description of the exemplary embodiments of the present disclosure, a detailed description of known functions and configurations incorporated herein will be omitted when it may make the subject matter of the present disclosure rather unclear. Furthermore, the accompanying drawings will be exemplarily provided to describe the exemplary embodiments of the present disclosure, and should not be construed as being limited to the exemplary embodiments set forth herein, and it will be understood that the exemplary embodiments of the present disclosure are provided only to completely disclose the present disclosure and cover modifications, equivalents or alternatives which come within the scope and technical range of the present disclosure.

In the following description of the embodiments, terms, such as "first" and "second", are used only to describe various elements, and these elements should not be construed as being limited by these terms. These terms are used only to distinguish one element from other elements.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present.

As used herein, singular forms may be intended to include plural forms as well, unless the context clearly indicates otherwise.

In the following description of the embodiments, the terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Hereinafter, reference will now be made in detail to exemplary embodiments of the present disclosure, examples of which are illustrated in the accompanying drawings. Wherever possible, the same reference numbers will be used throughout the drawings to refer to the same or like parts.

Figure 2:
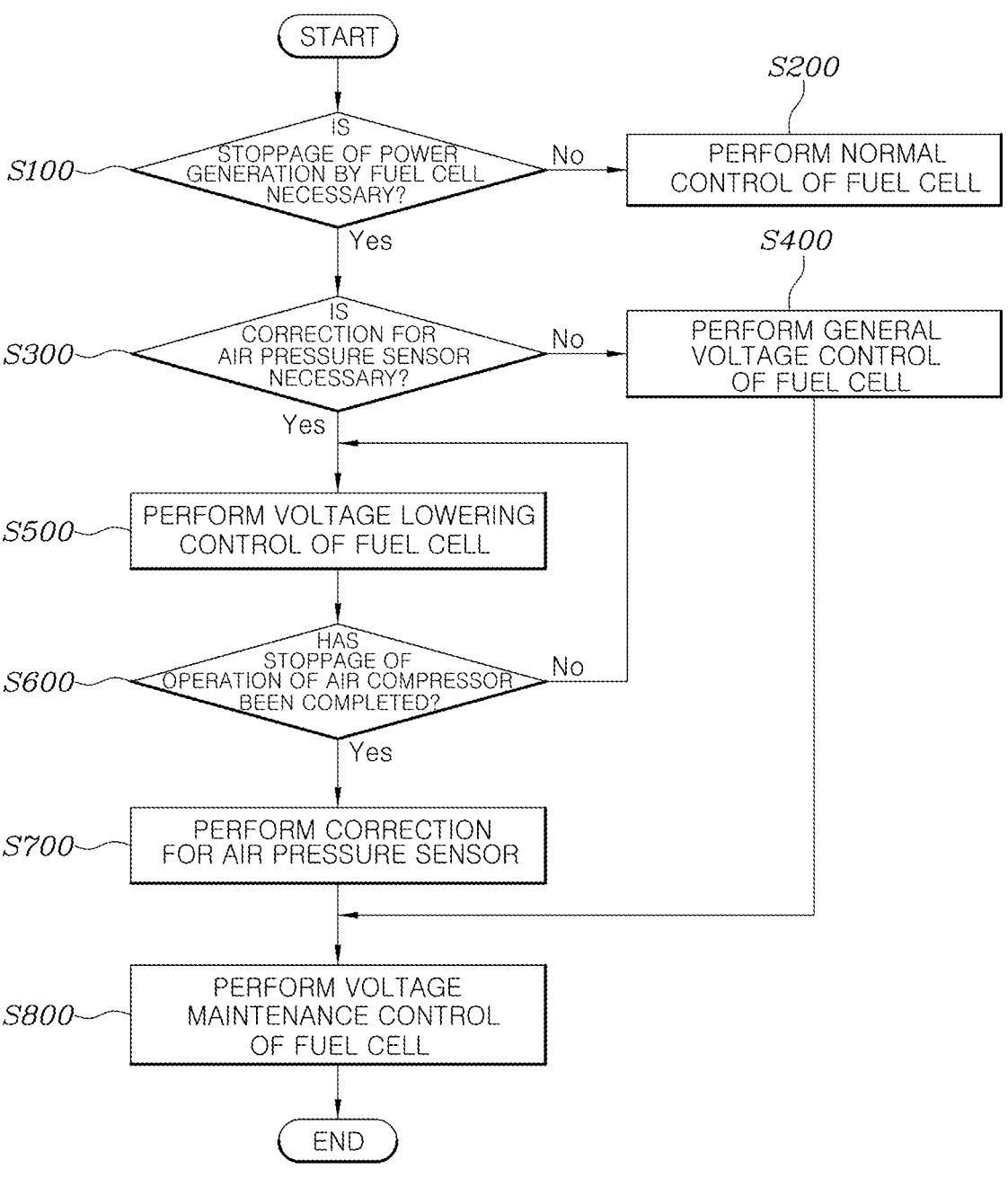
FIG. 2 is a flowchart representing a method for controlling the air supply system for fuel cells according to an exemplary embodiment of the present disclosure.

FIG. 1 is a block diagram of an air supply system for fuel cells according to an exemplary embodiment of the present disclosure, and FIG. 2 is a flowchart representing a method for controlling the air supply system for fuel cells according to an exemplary embodiment of the present disclosure.

FIG. 1 is a block diagram of an air supply system for fuel cells according to an exemplary embodiment of the present disclosure. The air supply system for fuel cells according to an exemplary embodiment of the present disclosure includes a fuel cell 100, an air supply line 400 connected to a cathode of the fuel cell 100 to supply external air to the cathode of the fuel cell 100, an air pressure sensor 700 provided on the air supply line 400, and configured to measure the pressure in the air supply line 400, a determiner 900 configured to determine whether or not correction for the air pressure sensor 700 is necessary, and a controller 800 configured to perform correction for the air pressure sensor 700 by performing voltage control of the fuel cell 100, upon determining that correction for the air pressure sensor 700 is necessary.

The controller 800 according to an exemplary embodiment of the present disclosure may be implemented through a non-volatile memory configured to store an algorithm configured to control operations of various elements of a vehicle or data regarding software commands for reproducing the algorithm and a processor configured to perform operations which will be described below using data stored in the corresponding memory. Here, the memory and the processor may be implemented as individual chips. Alternatively, the memory and the processor may be implemented as a single integrated chip, and the processor may be provided in a form of one or more processors.

The air supply system for fuel cells includes the fuel cell 100, the air supply line 400 connected to the cathode of the fuel cell 100, an air compressor 200 provided on the air supply line 400 to supply air to the fuel cell 100, etc. The conventional air supply system for fuel cells has an air pressure control valve 500 configured to control the pressure of air supplied to the fuel cell 100. The controller 800 is configured to control the pressure of air supplied to the fuel cell 100 depending on a target air flow rate or the operation temperature of the fuel cell 100 using the opening amount of the air pressure control valve 500 fixed depending on specific conditions during control of the air pressure. However, because the opening of the air pressure control valve 500 is fixed based only on the specific conditions, a measurement error may occur when the pressure of the cathode of the fuel cell 100 is controlled as the environment of the fuel cell 100 is changed due to internal and external factors.

In the present disclosure, to minimize such an error occurring when the pressure of the cathode of the fuel cell 100 is controlled, the air pressure sensor 700 which measures the pressure of air supplied to the cathode of the fuel cell 100 is provided. It may be confirmed through tests that control of the pressure of air supplied to the cathode of the fuel cell 100 through the air pressure control valve 500 without using the air pressure sensor 700 accelerates deterioration of the fuel cell 100 compared to control of the pressure of air supplied to the cathode of the fuel cell 100 through the air pressure sensor 700. Therefore, in the present disclosure, the air pressure sensor 700 is provided to prevent deterioration of the fuel cell 100, performing feedback control of the pressure of air supplied to the cathode of the fuel cell 100.

The air supply system for fuel cells according to an exemplary embodiment of the present disclosure further includes the air compressor 200 provided on the air supply line 400, and configured to supply air to the fuel cell 100, and an air cutoff valve 600 provided on the air supply line 400, and located between the fuel cell 100 and the air compressor 200. Furthermore, the air pressure sensor 700 is provided between the air cutoff valve 600 and the fuel cell 100 on the air supply line 400. The position of the air pressure sensor 700 may be freely set on the air supply line 400 of the air supply system for fuel cells. However, according to an exemplary embodiment of the present disclosure, the position of the air pressure sensor 700 is specified to a region between the air cutoff valve 600 and the fuel cell 100. Furthermore, the air pressure sensor 700 may cause an error when the pressure of air supplied to the cathode of the fuel cell 100 is measured. Therefore, in the present disclosure, the air supply system for fuel cells includes the air pressure sensor 700, and also includes control logic configured to correct the error of the pressure of air measured by the air pressure sensor 700.

To determine whether or not correction for the air pressure sensor 700 is necessary prior to performing correction for the air pressure sensor 700, the air supply system for fuel cells according to an exemplary embodiment of the present disclosure may further include the determiner 900. First, the controller 800 confirms whether or not the fuel cell 100 stops power generation and is thus in the idle state. In general, in the case in which correction for a pressure sensor is necessary, a corresponding system is completely stopped, and then, correction for the pressure sensor is performed. However, in the present disclosure, to increase consistency of correction for the air pressure sensor 700, correction for the air pressure sensor 700 is performed in the state in which the fuel cell 100 is being operated. Correction for the air pressure sensor 700 is performed using the idle state of the fuel cell 100.

Thereafter, the determiner 900 needs to determine whether or not correction for the air pressure sensor 700 is necessary in the idle state of the fuel cell 100 after the fuel cell 100 has stopped power generation. The controller 800 does not need to execute logic to perform correction for the air pressure sensor 700 even though correction for the air pressure sensor 700 is not necessary. Therefore, the determiner 900 determines that correction for the air pressure sensor 700 is necessary, when the air pressure sensor 700 detects the pressure of air for a time exceeding a reference time. Furthermore, the determiner 900 determines that correction for the air pressure sensor 700 is necessary, when a time measurement function to measure the detecting time of the air pressure sensor 700 does not work. The air pressure sensor 700 is configured to measure the pressure of air supplied to the cathode of the fuel cell 100, and when a measurement error of the air pressure sensor 700 occurs, the amount of air supplied to the cathode of the fuel cell 100 may be excessive or insufficient. In the case that the amount of air supplied to the cathode of the fuel cell 100 is excessive or insufficient, the fuel cell 100 may deteriorate, or the output of the fuel cell 100 may be insufficient. Therefore, correction for the air pressure sensor 700 is a necessary process, and it is important for the determiner 900 to determine a point in time when correction for the air pressure sensor 700 is necessary.

When the air pressure sensor 700 detects the pressure of air for a time exceeding the reference time depending on the characteristics of the sensor 700, a measurement error occurs. Therefore, the determiner 900 needs to measure the time for which the air pressure sensor 700 detects the pressure of air, and determines that correction for the air pressure sensor 700 is necessary when the air pressure sensor 700 detects the pressure of air for a time exceeding the reference time. Furthermore, there may be a case in which the determiner 900 cannot measure the time for which the air pressure sensor 700 detects the pressure of air. Therefore, in case that the time measurement function to measure the time for which the air pressure sensor 700 detects the pressure of air does not work, the determiner 900 may determine that correction for the air pressure sensor 700 is necessary.

Thereafter, when the determiner 900 determines that correction for the air pressure sensor 700 is necessary, the controller 800 performs voltage lowering control of the fuel cell 100 in the idle state of the fuel cell 100, and performs correction for the air pressure sensor 700 when lowering of the voltage of the fuel cell 100 has been completed. The controller 800 configures an environment for performing correction for the air pressure sensor 700 upon determining that correction for the air pressure sensor 700 is necessary. In the present disclosure the controller 800 performs voltage lowering control of the fuel cell 100 when the fuel cell 100 is in the idle state, performing correction for the air pressure sensor 70. Voltage lowering control of the fuel cell 100 will be performed as follows.

The controllers 800 performs voltage lowering control of the fuel cell 100 until the air cutoff valve 600 is opened and the air compressor 200 is stopped. The air supply system for fuel cells according to an exemplary embodiment of the present disclosure further includes the air pressure control valve 500 provided on the air supply line 400 and located at the outlet side of the cathode of the fuel cell 100. Furthermore, the controller 800 performs voltage lowering control of the fuel cell 100 by shutting off the air pressure control valve 500. Referring to FIG. 1, the air supply system for fuel cells according to an exemplary embodiment of the present disclosure may further include a humidifier 300, and thus, may concretely specify the position of the air pressure control valve 500. The humidifier 300 may be connected to the outlet of the cathode of the fuel cell 100, and the air pressure control valve 500 may be provided on an extension of the air supply line 400, which is discharged outwards from the humidifier 300.

To perform correction for the air pressure sensor 700, the controller 800 needs to control the air pressure sensor 700 to be exposed to atmospheric pressure. A situation in which the air pressure sensor 700 is exposed to atmospheric pressure may be varied depending on the position of the air pressure sensor 700, and in an exemplary embodiment of the present disclosure, referring to FIG. 1, the position of the air pressure sensor 700 is specified to the region between the fuel cell 100 and the air cutoff valve 600. That is, the process of performing voltage lowering control of the fuel cell 100 by the controller 800 may be the same as the process of controlling the air pressure sensor 700 to be exposed to atmospheric pressure by the controller 800. Therefore, the controller 800 is configured to control the air cutoff valve 600, the air pressure control valve 500 and the air compressor 200 so that the air pressure sensor 700 is exposed to atmospheric pressure at the time of performance of voltage lowering control of the fuel cell 100. According to an exemplary embodiment of the present disclosure, to expose the air pressure sensor 700 to atmospheric pressure, the controller 800 may completely open the air cutoff valve 600, and may control the air compressor 200 to reach 0 RPM. Furthermore, the controller 800 may shut off the air pressure control valve 500. Therefore, to expose the air pressure sensor 700 to atmospheric pressure depending on the position thereof, the controller 800 completely opens the air cutoff valve 600, shuts off the air pressure control valve 500, and stops operation of the air compressor 200.

Thereafter, when operation of the air compressor 200 is stopped, the controller 800 determines that lowering of the voltage of the fuel cell 100 has been completed, and performs correction for the air pressure sensor 700. The controller 800 determines that lowering of the voltage of the fuel cell 100 has been completed, when operation of the air compressor 200 is completely stopped. Although the controller 800 is configured to control the air compressor 200 to reach 0 RPM at the time of performance of voltage lowering control of the fuel cell 100, rotation of a fan provided in the air compressor 200 may not be completely stopped for a predetermined time period due to inertia. When operation of the air compressor 200 is not completely stopped, there may be a possibility that external air may be forcibly introduced thereinto, and the introduced external air may cause an error at the time of correction for the air pressure sensor 700. Therefore, the controller 800 needs to confirm whether or not operation of the air compressor 200 is completely stopped. Furthermore, when the air compressor 200 is completely stopped, the controller 800 determines that voltage lowering control of the fuel cell 100 has been completed, and performs correction for the air pressure sensor 700. The controller 800 performs correction for the air pressure sensor 700 in the idle state of the fuel cell 100, being configured for increasing consistency of the corrected value of the air pressure sensor 700.

Furthermore, the controller 800 performs voltage maintenance control to maintain the idle state of the fuel cell 100, after correction for the air pressure sensor 700. The controller 800 performs voltage maintenance control by fixing the RPM of the air compressor 200 to a reference RPM and controlling the air cutoff valve 600. As described above, the controller 800 performs voltage lowering control in the idle state of the fuel cell 100 to perform correction for the air pressure sensor 700. In the case in which the controller 800 continues to perform voltage lowering control after correction for the air pressure sensor 700, the fuel cell 100 may be operated in an unstable state in which the fuel cell 100 is not configured for maintaining the idle state. Therefore, the controller 800 needs to perform voltage maintenance control of the fuel cell 100 using the air cutoff valve 600 so that the fuel cell 100 may maintain the idle state to be stably operated. According to an exemplary embodiment of the present disclosure, the controller 800 may adjust the opening amount of the air cutoff valve 600 to maintain the voltage of the fuel cell 100 to be equal to or less than a predetermined value at the time of performance of voltage maintenance control of the fuel cell 100. Furthermore, the controller 800 allows air supply by fixing the RPM of the air compressor 200 to the reference RPM. The controller 800 may adjust the opening amount of the air cutoff valve 600, being configured for suppressing current generation of a fuel cell system, and maintaining the voltage of the fuel cell 100 to be equal to or less than the predetermined voltage.

FIG. 2 is a flowchart representing a method for controlling the air supply system for fuel cells according to an exemplary embodiment of the present disclosure. The method for controlling the air supply system for fuel cells according to an exemplary embodiment of the present disclosure includes determining, by the determiner 900, whether or not correction for the air pressure sensor 700 is necessary (S300), and performing, by the controller 800, correction for the air pressure sensor 700 by performing voltage control of the fuel cell 100, upon determining that correction for the air pressure sensor 700 is necessary (S700). Hereinafter, the above-described control logic of the controller 800 will be described in brief.

First, the controller 800 confirms whether or not stoppage of power generation by the fuel cell 100 is necessary (S100). The control logic to perform correction for the air pressure sensor 700 according to an exemplary embodiment of the present disclosure is executed by maintaining the fuel cell 100 in the idle state, in the case in which stoppage of power generation by the fuel cell 100 is necessary. Therefore, it is necessary to confirm whether or not stoppage of power generation by the fuel cell 100 is necessary. When stoppage of power generation by the fuel cell 100 is not necessary, the controller 800 is configured to control the fuel cell 100 to normally generate power (S200).

When stoppage of power generation by the fuel cell 100 is necessary and thus the fuel cell 100 stops power generation, the fuel cell 100 enters the idle state. The determiner 900 determines whether or not correction for the air pressure sensor 700 is necessary after the fuel cell 100 has entered the idle state (S300). In Operation S300 of determining whether or not correction for the air pressure sensor 700 is necessary, the determiner 900 determines that correction for the air pressure sensor 700 is necessary when the air pressure sensor 700 detects the pressure of air supplied to the fuel cell 100 for a time exceeding the reference time. Furthermore, in Operation S300 of determining whether or not correction for the air pressure sensor 700 is necessary, the determiner 900 determines that correction for the air pressure sensor 700 is necessary when the time measurement function to measure the detecting time of the air pressure sensor 700 does not work. When the determiner 900 determines that correction for the air pressure sensor 700 is not necessary, the controller 800 performs general voltage control of the fuel cell 100 in the idle state of the fuel cell (S400).

In Operation S700 of performing correction for the air pressure sensor 700, the controller 800 performs voltage lowering control of the fuel cell 100 to open the air cutoff valve 600, to stop operation of the air compressor 200 and to shut off the air pressure control valve 500. When correction for the air pressure sensor 700 is necessary, the controller 800 performs voltage lowering control of the fuel cell 100 (S500). When the controller 800 performs voltage lowering control of the fuel cell 100, the controller 800 may lower the voltage of the fuel cell 100 by controlling the air cutoff valve 600, the air pressure control valve 500 and the air compressor 200. According to an exemplary embodiment of the present disclosure, the controller 800 completely opens the air cutoff valve 600, shuts off the air pressure control valves 500, and is configured to control the air compressor 200 to reach 0 RPM. Voltage lowering control of the fuel cell 100 provides a situation in which the air pressure sensor 700 provided on the air supply system for fuel cells is exposed to atmospheric pressure. Here, there may be various methods for exposing the air pressure sensor 700 to atmospheric pressure at the time of voltage lowering control of the fuel cell 100.

In Operation S700 of performing correction for the air pressure sensor 700, when operation of the air compressor 200 is completely stopped by performing voltage lowering control of the fuel cell 100, the controller 800 performs correction for the air pressure sensor 700. The controller 800 confirms whether or not operation of the air compressor 200 has stopped at the time of performance of voltage lowering control of the fuel cell 100 (S600). Although the controller 800 is configured to control the air compressor 200 to reach 0 RPM, the fan provided in the air compressor 200 may continue to rotate at a regular RPM due to inertia. When operation of the air compressor 200 is not completely stopped, an error may occur during the process of performing correction for the air pressure sensor 700, and thus, the controller 800 needs to confirm whether or not operation of the air compressor 200 is completely stopped. When operation of the air compressor 200 is not completely stopped, the controller 800 performs voltage lowering control of the fuel cell 100 until operation of the air compressor 200 is stopped. When the air compressor 200 is completely stopped, the controller 800 performs correction for the air pressure sensor 700 (S700). The controller 800 may perform correction for the air pressure sensor 700 by generating the situation in which the air pressure sensor 700 is exposed to atmospheric pressure by performing voltage lowering control of the fuel cell 100.

After correction for the air pressure sensor 700, the controller 800 performs voltage maintenance control so that the fuel cell 100 may maintain the idle state (S800). When the controller 800 continues to perform voltage lowering control of the fuel cell 100 in the idle state of the fuel cell 100 to perform correction for the air pressure sensor 700, the fuel cell 100 may not stably maintain the idle state. Therefore, the controller 800 needs to perform voltage maintenance control of the fuel cell 100 so that the fuel cell 100 may stably maintain the idle state, when correction for the air pressure sensor 700 has been completed.

In the air supply system for fuel cells and the method for controlling the same according to an exemplary embodiment of the present disclosure, the air pressure sensor is provided at the inlet side of the cathode of the fuel cell to periodically detect the pressure of the cathode of the fuel cell, being configured for preventing degradation of power generation by the fuel cell and deterioration of the fuel cell due to a decrease in air pressure.

Furthermore, correction for the air pressure sensor is performed in the idle state of the fuel cell, being configured for reflecting the operation conditions of the fuel cell and thus increasing accuracy in the detecting value of the air pressure sensor.

As is apparent from the above description, in an air supply system for fuel cells and a method for controlling the same according to an exemplary embodiment of the present disclosure, an air pressure sensor is provided at the inlet side of a cathode of a fuel cell to periodically detect the pressure of the cathode of the fuel cell, being configured for preventing degradation of power generation by the fuel cell and deterioration of the fuel cell due to a decrease in air pressure.

Furthermore, correction for the air pressure sensor is performed in the idle state of the fuel cell, being configured for reflecting the operation conditions of the fuel cell and thus increasing accuracy in the detecting value of the air pressure sensor.

In an exemplary embodiment of the present invention, the determiner 900 may be integrated to the controller 800.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An air supply system for fuel cells, the air supply system comprising:
   a fuel cell;
   an air supply line connected to a cathode of the fuel cells to supply external air to the cathode of the fuel cells;
   an air pressure sensor provided on the air supply line, and configured to measure a pressure in the air supply line;
   a determiner configured to determine whether correction for the air pressure sensor is necessary; and
   a controller connected to the determiner and configured to perform the correction for the air pressure sensor by performing voltage control of the fuel cells, when the correction for the air pressure sensor is necessary,
   wherein the determiner is configured to determine whether the correction for the air pressure sensor is necessary in an idle state of the fuel cells after stoppage of power generation by the fuel cells.

2. The air supply system of claim 1, further including:
   an air compressor provided on the air supply line, and configured to supply the external air to the fuel cells; and
   an air cutoff valve provided on the air supply line, and located between the fuel cells and the air compressor,
   wherein the air pressure sensor is provided between the fuel cells and the air cutoff valve on the air supply line.

3. The air supply system of claim 1, wherein the determiner is configured to conclude that the correction for the air pressure sensor is necessary, when the air pressure sensor detects the pressure for a time exceeding a reference time.

4. The air supply system of claim 1, wherein the determiner is configured to conclude that the correction for the air pressure sensor is necessary, when a time measurement function to measure a detecting time of the air pressure sensor is out of order.

5. The air supply system of claim 1, wherein the controller is configured to perform voltage maintenance control of the fuel cells so that the fuel cells maintain the idle state, after the correction for the air pressure sensor has been performed.

6. The air supply system of claim 5, wherein the controller is configured to perform the voltage maintenance control by fixing revolutions per minute (RPM) of an air compressor to a reference RPM and controlling an air cutoff valve provided on the air supply line.

7. An air supply system for fuel cells, the air supply system comprising:
   a fuel cell;
   an air supply line connected to a cathode of the fuel cells to supply external air to the cathode of the fuel cells;
   an air pressure sensor provided on the air supply line, and configured to measure a pressure in the air supply line;
   a determiner configured to determine whether correction for the air pressure sensor is necessary; and
   a controller connected to the determiner and configured to perform the correction for the air pressure sensor by performing voltage control of the fuel cells, when the correction for the air pressure sensor is necessary,
   wherein the controller is configured to perform voltage lowering control of the fuel cells in an idle state, when the correction for the air pressure sensor is necessary, and to perform the correction for the air pressure sensor, when lowering of a voltage of the fuel cells has been completed.

8. The air supply system of claim 7, wherein the controller is configured to perform the voltage lowering control of the fuel cells until an air cutoff valve provided on the air supply line is opened and operation of an air compressor is stopped.

9. The air supply system of claim 7, further including an air pressure control valve provided on the air supply line and connected to the controller, and located at an outlet side of the cathode of the fuel cells, wherein the controller is configured to perform the voltage lowering control of the fuel cells by shutting off the air pressure control valve.

10. The air supply system of claim 7, wherein the controller is configured to conclude that the lowering of the voltage of the fuel cells has been completed, when operation of an air compressor is stopped, and to perform the correction for the air pressure sensor.

11. A method for controlling an air supply system for fuel cells, the method comprising:

determining, by a determiner, whether correction for an air pressure sensor provided on an air supply line of the air supply system and configured to measure a pressure in the air supply line is necessary; and performing, by a controller connected to the determiner, the correction for the air pressure sensor by performing voltage control of the fuel cells, when the correction for the air pressure sensor is necessary, wherein the determiner is configured to determine whether the correction for the air pressure sensor is necessary in an idle state of the fuel cells after stoppage of power generation by the fuel cells.

12. The method of claim 11, wherein, in the determining as to whether the correction for the air pressure sensor is necessary, the determiner is configured to conclude that the correction for the air pressure sensor is necessary when the air pressure sensor is operated for a time exceeding a reference time.

13. The method of claim 11, wherein, in the determining as to whether the correction for the air pressure sensor is necessary, the determiner is configured to conclude that the correction for the air pressure sensor is necessary when a time measurement function to measure a detecting time of the air pressure sensor is out of order.

14. The method of claim 11, wherein the controller is configured to perform voltage lowering control of the fuel cells in the idle state, when the correction for the air pressure sensor is necessary, and to perform the correction for the air pressure sensor, when lowering of a voltage of the fuel cells has been completed.

15. The method of claim 11, wherein an air compressor is provided on the air supply line connected to a cathode of the fuel cells, and configured to supply air to the fuel cells; and wherein an air cutoff valve is provided on the air supply line, and located between the fuel cells and the air compressor.

16. The method of claim 15, wherein, in the performing the correction for the air pressure sensor, the controller is configured to perform voltage lowering control of the fuel cells to open the air cutoff valve, to stop operation of the air compressor and to shut off an air pressure control valve provided on the air supply line and connected to the controller and located at an outlet side of the cathode of the fuel cells,.

17. The method of claim 16, wherein, in the performing the correction for the air pressure sensor, the controller is configured to perform the correction for the air pressure sensor, when the air compressor is completely stopped through the voltage lowering control of the fuel cells.

18. The method of claim 11, wherein the controller is configured to perform voltage maintenance control of the fuel cells so that the fuel cells maintain the idle state, after the correction for the air pressure sensor has been performed.

19. The method of claim 18, wherein the controller is configured to perform the voltage maintenance control by fixing revolutions per minute (RPM) of an air compressor to a reference RPM and controlling an air cutoff valve provided on the air supply line.

* * * * *